United States Patent
Sasaki et al.

(10) Patent No.: US 6,277,516 B1
(45) Date of Patent: Aug. 21, 2001

(54) LEAD FOR USE WITH LITHIUM-ION SECONDARY CELL, LEAD RIBBON, LITHIUM-ION SECONDARY CELL AND METHOD OF SEALING CONTAINER OF LITHIUM-ION SECONDARY CELL

(75) Inventors: Yoshinari Sasaki; Koichi Muto; Hisashi Ohba, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/253,049

(22) Filed: Feb. 19, 1999

(30) Foreign Application Priority Data

Feb. 24, 1998 (JP) .................................................. 10-042527
May 25, 1998 (JP) .................................................. 10-143128

(51) Int. Cl.⁷ ..................................................... H01M 6/12
(52) U.S. Cl. ........................... 429/162; 429/185; 429/179; 429/181; 29/623.2; 29/623.5; 428/35.7
(58) Field of Search .................................... 429/162, 163, 429/176, 181, 185, 127, 131, 175, 178, 179, 180; 428/35.7; 525/92 R, 90; 29/623.1, 623.2, 623.4, 623.5

(56) References Cited

U.S. PATENT DOCUMENTS

| 5,547,782 | * | 8/1996 | Dasgupta et al. ..................... 429/194 |
| 5,800,945 | * | 9/1998 | Grivel et al. .......................... 429/176 |
| 6,045,883 | * | 4/2000 | Akiyama et al. .................... 428/35.7 |
| 6,145,280 | * | 11/2000 | Daroux et al. ......................... 53/433 |

\* cited by examiner

*Primary Examiner*—Gabrielle Brouillette
*Assistant Examiner*—Raymond Alejandro
(74) *Attorney, Agent, or Firm*—Sonnenschein, Nath & Rosenthal

(57) ABSTRACT

A lithium-ion secondary cell is provided to remarkably improve a mechanical peel strength of heat fusion-bonding portions of a container as well as to improve a moisture permeability resistance, a sealing performance, a barrier property, a safety or the like of the container. A lead (3) for use with a lithium-ion secondary cell according to the present invention is sandwiched by heat fusion-bonding portions (2) of a container (5) so as to be exposed in the outside of the container (5) when the container (5) is sealed by heat fusion-bonding. The lead (3) is coated with a heat fusion-bonding seal material (1). This heat fusion-bonding seal material (1) has an excellent adhesion to the lead (3) rather than a material of a sealant layer (19). Also, in the lithium-ion secondary cell, an end portion (1a) on the outside portion in the longitudinal direction of the lead (3) in the layer made of the heat fusion-bonding seal material (1) is exposed from the end face of the container (5). Moreover, the lithium-ion secondary cell may have the lead (3) having a mesh structure.

7 Claims, 11 Drawing Sheets

LEAD FOR USE WITH LITHIUM-ION SECONDARY CELL, LEAD RIBBON, LITHIUM-ION SECONDARY CELL AND METHOD OF SEALING CONTAINER OF LITHIUM-ION SECONDARY CELL

BACKGROUND OF THE INVENTION

1. Field of the Invention

The present invention relates to a lead for use with a lithium-ion secondary cell, a lead ribbon, a lithium-ion secondary cell and a method of sealing a container of the lithium-ion secondary cell.

2. Description of the Related Art

Recently, as a demand of cordless and portable electronic devices increases, there have been developed a variety of portable electronic devices which are miniaturized, made light in weight and thin in thickness one after another. Concurrently therewith, a battery serving as an energy source of such an electronic device shares a large ration of the whole of the electronic device. Further, as an electronic device becomes a multifunction electronic device, a power consumption thereof increases so that a capacity of a cell unavoidably increases considerably, thereby resulting in a volume of a secondary cell being increased. Thus, there is an increasing demand of a miniaturized secondary cell having a high energy density.

As secondary cells that have been used heretofore, there are known a lead storage battery and a nickel-cadmium battery. Also, as a new secondary cell, a nickel-hydrogen cell and a lithium-ion cell are now commercially-available on the market. Since these secondary cells use liquid as an electrolyte, they cannot avoid a problem of a leakage thereof. A solidification of electrolyte, i.e. solid electrolyte battery is a powerful means for solving the problem. As typical powerful means, there is a polymer lithium-ion secondary cell using a polymer electrolyte in which a plasticizer is mixed into a polymer. Thus, it becomes possible to manufacture a secondary cell having no risk of leakage and which may be miniaturized, made light in weight and reduced in thickness, thereby resulting in a secondary cell with a high energy density.

As a fundamental arrangement of a polymer lithium-ion secondary cell, a polymer lithium-ion secondary cell is generally comprised of a positive electrode, a negative electrode and a polymer electrolyte. While a variety of polymer electrolytes are developed, electrolytes such as polyacrylonitrile (PAN), polyethylene oxide (PEO), polyvinylidene fluoride (PVdF) and so on are typically known as major electrolytes.

An arrangement of a polymer lithium-ion secondary cell will be described next.

FIGS. 1A and 1B are respectively diagrams showing a structure of a polymer lithium-ion cell obtained when a polyacrylonitrile (PAN) system gel electrolyte is used. As shown in FIGS. 1A and 1B, an activator made of $LiCoO_2$ and graphite is laminated on a positive electrode current collector 9 made of an aluminum thin plate and an activator made of MCMB, carbon and natural graphite is laminated on a negative electrode current collector 14, which form electrodes. An isolating material (polypropylene, etc.) called a separator is disposed between the positive electrode current collector 9 and the negative electrode current collector 14, and a polyacrylonitrile (PAN) system gel electrolyte is filled into clearances thereof, thereby resulting in a sandwich structure being obtained.

As a container for the sandwich structure, the product is packed/packaged by a laminate material made of an aluminum film and a plastic film. In that case, a cell may be reduced in thickness and increased in capacity by selectively laminating one elemental cell (unit cell) having the sandwich structure as shown in FIG. 2A, rewinding one unit cell as shown in FIG. 2B or folding one unit cell as shown in FIG. 2C or combining the above-mentioned laminated structure, the rewound structure or the folded structure.

Then, the assembly process of the polymer lithium-ion secondary cell will be described with reference to FIGS. 3A to 3D to FIGS. 5A to 5E.

Initially, in the mixing process shown in FIG. 3A, a positive electrode material or a negative electrode material is manufactured by preparing/mixing materials made of an activator, a conductive material, a binder, a volatile solvent or the like. In the next coating process, as shown in FIG. 3B, this positive electrode material or negative electrode material is coated on the positive electrode/negative electrode current collector by a roll coater, baked and then dried. While the roll coater has been described as an example of a coating method, the coating method is not limited thereto, and any method may be used so long as the positive electrode material or the negative electrode material may be coated uniformly. In the next press process as shown in FIG. 3C, the resultant electrode material in which this positive electrode material or the negative electrode material is baked and dried on the positive electrode/negative electrode current collector is pressed in the equal direction by an interlaminar press treatment, thereby resulting in an electrode density being increased. In the next slitter process, as shown in FIG. 3D, the resultant product in which the electrode material is pressed in the equal direction by this interlaminar press treatment is cut as a ribbon-shaped having a constant width.

In the next vacuum dry process shown in FIG. 4A, the resultant product of ribbon-shape having the constant width is dried in the vacuum as shown in FIG. 4A. According to the next lead welding process, in the resultant process which was dried in the vacuum as shown in FIG. 4B, a lead 3 is welded to the surface of a metal on which the positive electrode material or the negative electrode material is not coated. In the next electrolysis solution vacuum impregnation process as shown in FIG. 4C, the electrolysis solution is impregnated into the positive electrode material or the negative electrode material by using vacuum suction. In the next electrolyte gel coating and rewinding process as shown in FIG. 4D, a gel electrolyte is uniformly coated on both surfaces of the separator, and the separator, the positive electrode current collector in which the positive electrode is formed and the negative electrode current collector in which the negative electrode is formed are rewound in the order of the positive electrode current collector, the separator and the negative electrode current collector, thereby resulting in a unit cell being formed. At that time, a unit cell having a width and a laminated thickness matched with a required arbitrary size and a cell capacity may be completed by selecting a unit cell rewinding method, a unit cell laminating method, a unit cell folding method or the like.

In the packing process shown in FIG. 5A, the product in which the separator, the positive electrode current collector and the negative electrode current collector are rewound in the order of the positive electrode current collector, the separator and the negative electrode current collector is packed into a laminate film (e.g. three-layer structure of polyethylene terephthalate/aluminum film/non-elongated polypropyrene) which serves as a thin container 5 for a polymer lithium-ion secondary cell. In the next press process as shown in FIG. 5B, a resultant product in which the unit cell is packed into the container is pressed. In the next vacuum sealing process as shown in FIG. 5C, only the lead is exposed from the container thus pressed with the unit cell under reduced pressure atmosphere, and one side of the container is sealed. Although a heat fusion-bonding method (hot plate adhesion method, impulse adhesion method, ultrasonic adhesion method, high-frequency adhesion method and hot-air adhesion method) is convenient as a method of sealing a laminate film, so long as a sealing performance and a moisture permeability resistance are excellent, an adhesive system and an adhesive coating method (hot-melt method and cold-glue method) are also possible. In the next charging and discharging method as shown in FIG. 5D, it is inspected by repeatedly charging and discharging a resultant product in which the container with the unit cell therein is sealed whether or not a predetermined battery characteristic is obtained. After the above-mentioned processes, there is completed a polymer lithium-ion secondary cell as shown in FIG. 5E.

Here, it is known that various material that are used in the polymer lithium-ion secondary cell are very sensitive to water in the atmosphere and that a barrier property and a moisture permeability resistance of the laminate film obtained after the container was sealed become factors which influence the life span of the battery.

As shown on the table 1 below, these factors are caused by reliability of heat fusion-bonding method used in the heat fusion-bonding portions of upper and lower laminate films, materials of laminate films, shapes of leads and problems such as bonding property/adhesive property/sealing performance of the lead and the laminate film.

TABLE 1

| Plastic film | Hot plate adhesive | Impulse bonding method | Ultra-sonic bonding method | High frequency bonding method | Hot-air bonding method |
|---|---|---|---|---|---|
| polyethylene film | ⊚ | ⊚ | ○ | — | ⊚ |
| non-elongated polypropyrene film | ⊚ | ⊚ | ○ | — | ⊚ |
| elongated polypropyrene film | ○ | ⊚ | ○ | — | ⊚ |
| nutrient cellophane | — | — | — | — | — |
| moisture-proof cellophane | ⊚ | ○ | ○ | — | — |
| acetate film | ○ | ○ | ○ | ○ | ○ |
| hard vinyl chloride film | ○ | ○ | ○ | ⊚ | ⊚ |
| soft vinyl chloride film | ⊚ | ○ | ○ | ⊚ | ⊚ |
| polyvinylidene chloride film | ○ | ○ | ○ | ⊚ | ○ |
| polystyrene film | ○ | ⊚ | ⊚ | — | ○ |
| polyvinyl alcohol film | ⊚ | ○ | ○ | ○ | ⊚ |
| polyester film | — | ○ | ○ | — | ○ |
| polycarbonate film | ○ | ⊚ | ⊚ | — | ○ |
| nylon film | ⊚ | ⊚ | ⊚ | ○ | ○ |
| polyethylene cellophane | ⊚ | ⊚ | — | — | — |

Notes:
⊚: available methods
○: possible methods
—: difficult or extremely-disadvantageous methods On the other hand, in the manufacturing process of the above-mentioned polymer lithium-ion secondary cell, in the vacuum sealing process, i.e. the process for sealing the unit cell into the container made of laminate film under pressure reduced atmosphere, a sealing work based on the heat fusion-bonding method is frequently used from standpoints of low cost, quality and work property. At that time, the plastic film material which serves as the heat fusion-bonding portions on the upper and lower two innermost layers of the laminate film is limited to limited plastic materials because of an affinity of gel electrolyte and contained solvent. In the case of polyacrylonitrile (PAN) system gel electrolyte, for example, the plastic material is limited to polyolefin (polyethylene, polypropyrene, etc.) which does not contain base.

Also, in the vacuum sealing process, due to unstable heat fusion-bonding conditions and materials of laminate film, there arise the following problems.

Specifically, when conditions of a temperature, a pressure and a time in the heat fusion-bonding are optimum, as shown in FIG. 6A, the heat fusion-bonding is properly effected on heat fusion-bonding portions 2 of sealant layers 19. However, when the conditions of the temperature, the pressure and the time in the heat fusion-bonding are fluctuated to provide an excessive heat fusion-bonding, as shown in FIG. 6B, the sealant layer 19 within the laminate film is broken/removed to expose and heat fusion-bond an aluminum layer 18 (conductor) which is used as a film intermediate layer to improve a moisture permeability resistance. Moreover, when the aluminum film 18 comprising the laminate film is exposed from the cut end face of the laminate film, it is frequently observed that the aluminum film 18 that is exposed from the cut end face of the laminate film contacts with a positive electrode lead 23 and a negative electrode lead 24. This contact becomes a main cause to cause the positive electrode lead 23 and the negative electrode lead 24 to be short-circuited through the aluminum film 18 within the laminate film.

To avoid this drawback, there has hitherto been adopted a method of preventing the aluminum film 18 exposed from the cut face of the laminate film and the lead 3 from contacting with each other by a folded portion 7 provided only at the sealing portion of the electrode as shown in FIG. 7. In this case, the cut face of the laminate film is folded and fixed by a tape.

However, the above-mentioned conventional polymer lithium-ion secondary cell encounters with the following problems.

Specifically, as described above, since the plastic film materials which serve as the heat fusion-bonding portions on the upper and lower two innermost layers of the laminate film are limited to the polyolefin materials such as polyethylene or the like and polypropyrene which contains no base because of an affinity of gel electrolyte and contained solvent in the case of polyacrylonitrile (PAN) system gel electrolyte, for example.

However, these materials have poor adhesive property/bonding property with leads (aluminum, nickel or SUS serving as a positive electrode current collector or copper and the like for a negative electrode current collector), have poor container's moisture permeability resistance, sealing performance, barrier property and safety and have a poor mechanical peel strength of the heat fusion-bonding portion of the container.

Also, as described above, when the conditions of the temperature, the pressure and the time of the heat fusion-bonding are fluctuated to provide the excessive heat fusion-bonding, this becomes the main cause to cause the positive electrode lead and the negative electrode lead to be short-circuited through the aluminum film within the laminate film. As a countermeasure for solving this problem, there is adopted the method of forming the folded portion only on the portion in which the electrode is sealed.

However, although the short-circuit between the positive electrode and the negative electrode through the aluminum film exposed from the end face of the laminate film may be avoided according to this method, it is unavoidable hence productivity/yield/reliability of quality of the polymer lithium-ion secondary battery are lowered and hence a manufacturing cost is increased.

Also, in the heat fusion-bonding process of the container, a heat should be sufficiently conducted from a heating apparatus to the sheath layers of the laminate film upper films and the laminate film lower layer, the aluminum films and the sealant layers and the leads. It takes a long time to effect the heat fusion-bonding by this heating, which causes a productivity to be lowered.

Moreover, since the width of the heat fusion-bonding portion of the container is difficult to be increased due to various conditions, there is a limit in increasing the area in which the heat fusion-bonding portion and the lead are bonded together. As a result, there is then the defect that a sealing performance of a cell container may not be improved much more.

Furthermore, in the above-mentioned lead welding process, leads of slit-shape should be supplied to the production line one by one. There is then the defect that it is difficult to smoothly and automatically supply the leads to production facilities in consideration of the automation.

SUMMARY OF THE INVENTION

In view of the aforesaid aspect, it is an object of the present invention to provide a lead for use with a lithium-ion secondary cell, a lithium-ion secondary cell and a method of sealing a container of lithium-ion secondary cell in which a moisture permeability resistance, a sealing performance, a barrier property, a safety or the like of a container may be improved and a mechanical peel strength of heat fusion-bonding portions of a container may be improved remarkably.

It is another object of the present invention to provide a lithium-ion secondary cell in which a short-circuit between a positive electrode and a negative electrode through an aluminum film exposed from an end face of a laminate film may be prevented.

It is a further object of the present invention to provide a method of sealing a container of a lithium-ion secondary cell in which a time required to integrally bond a sealant layer of a laminate film and a lead by heat fusion-bonding may be reduced considerably.

It is yet a further object of the present invention to provide a lead for use with a lithium-ion secondary cell and a lithium-ion secondary cell in which an area in which a heat fusion-bonding portion of a container and a lead are bonded may be increased.

It is a still further object of the present invention to provide a lead ribbon in which leads may be smoothly and automatically supplied to production facilities in consideration of the automation feed of leads.

According to an aspect of the present invention, there is provided a lead for use with a lithium-ion secondary cell sandwiched by heat fusion-bonding portions of a container so as to be exposed to the outside of the container when the container of the lithium-ion secondary cell is sealed by heat fusion-bonding. The lead for use with a lithium-ion secondary cell is arranged such that the lead is coated with a heat fusion-bonding seal material and that the heat fusion-bonding seal material has a lead adhesion property better than a material of the heat fusion-bonding portions.

According to the lead for use with a lithium-ion secondary cell of the present invention, since the lead is coated with the heat fusion-bonding seal material and this heat fusion-bonding seal material has a lead adhesion property better than the material of the heat fusion-bonding portions, the heat fusion-bonding seal material and the sealant layer of the upper layer of the laminate film, and the heat fusion-bonding seal material and the sealant layer of the lower layer of the laminate film may be bonded strongly by heat heat fusion-bonding, especially, the heat fusion-bonding seal material and the lead may be bonded together very strongly.

According to the lithium-ion secondary cell of the present invention, the layer made of the heat fusion-bonding seal material is exposed from the end face of the container at its end portion on the outer portion side along the longitudinal direction of the lead.

According to the lithium-ion secondary cell of the present invention, since the end portion on the outer portion side of the heat fusion-bonding seal material is exposed from the end face of the container, an electrical insulation between the lead and the aluminum film exposed from the end face of the laminate film may be maintained.

The method of sealing a container of a lithium-ion secondary cell according to the present invention includes a process for preheating a heat fusion-bonding seal material prior to a process for sealing the heat fusion-bonding portion by heat fusion-bonding.

According to the method of sealing the container of the lithium-ion secondary cell of the present invention, since the heat fusion-bonding seal material is preheated before the heat fusion-bonding portions are sealed, a heat required to integrally bond the sealant layer of the laminate film and the lead by heat fusion-bonding may be conducted in a short period of time.

The lithium-ion secondary cell according to the present invention includes a lead having a mesh structure.

According to the lithium-ion secondary cell of the present invention, since the lead has the mesh structure, it is possible to increase an area in which the lead metal and the heat fusion-bonding seal material are bonded together.

The ribbon for the lead according to the present invention is arranged such that the ribbon is coated with a heat fusion-bonding seal material at every constant interval of its longitudinal direction.

According to the ribbon for the lead of the present invention, since the ribbon is coated with the heat fusion-bonding seal material at every constant interval of its longitudinal direction, this ribbon may be rewound around a reel and the ribbon may be supplied to a production line in the form of the reel.

According to the present invention, there is provided a lead for use with a lithium-ion secondary cell sandwiched by heat fusion-bonding portions of a container so as to be exposed to the outside of the container when the container of the lithium-ion secondary cell is sealed by heat fusion-bonding. The lead for use with a lithium-ion secondary cell is arranged such that the lead is coated with a resin material and that the coating material has a shape of a cross-section perpendicular to the longitudinal direction of the lead in such a manner that a thickness thereof is reduced in both sides of at least its width direction as it goes to the outside.

According to the lead for use with a lithium-ion secondary cell of the present invention, since the coating material has a shape of a cross-section perpendicular to the longitudinal direction of the lead in such a manner that a thickness thereof is reduced in both sides of its width direction as it goes to the outside, it is possible to prevent a clearance from being produced between the fused sealant layer and the fused coating material.

DESCRIPTION OF THE PREFERRED EMBODIMENTS

An embodiment according to the present invention will hereinafter be described with reference to FIGS. 8 to 10.

Initially, a lead coated with a heat fusion-bonding seal material will be described, and its effects will be referred to.

Figure 8:
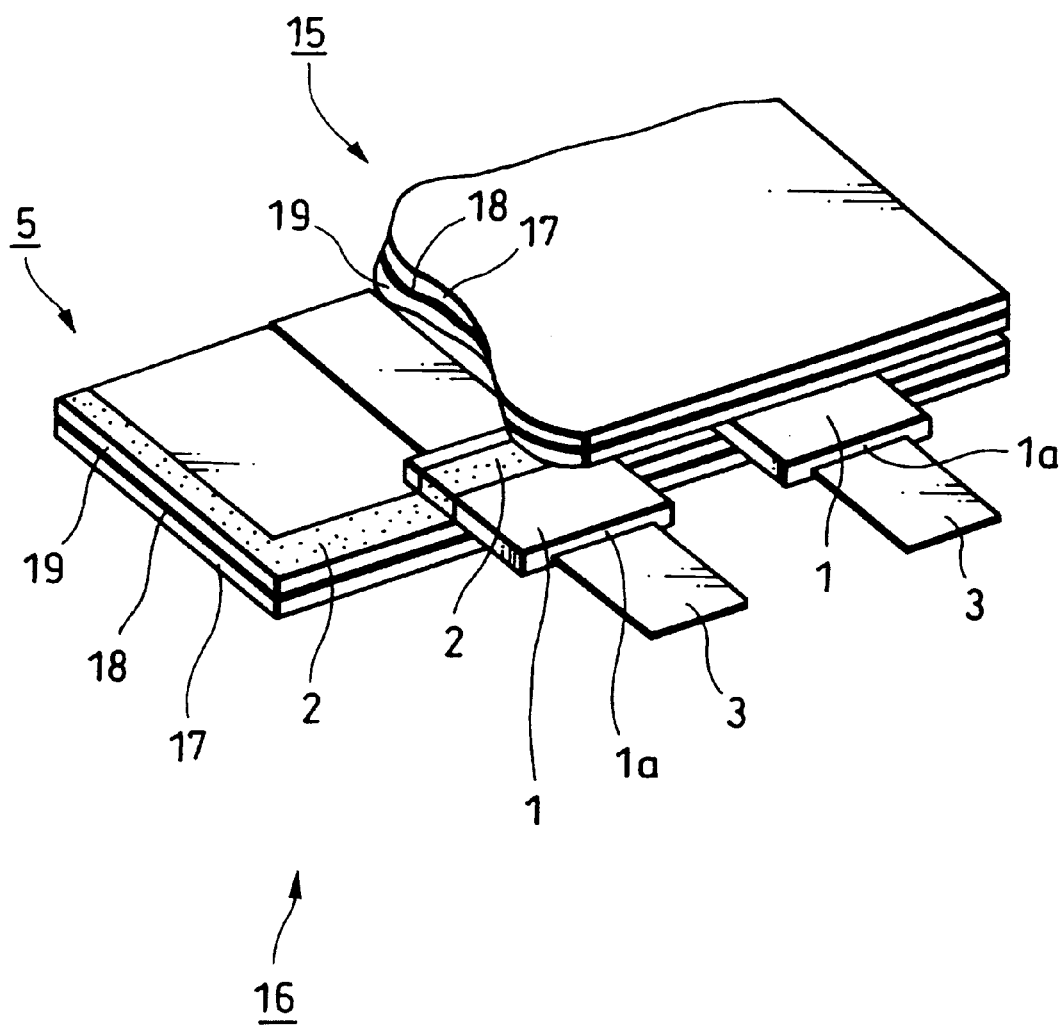
FIG. 8 is a perspective view illustrating a relationship between a lead and a container in a polymer lithium-ion secondary cell according to the present invention.

FIG. 8 is a perspective view illustrating conceptually an example in which a lead according to the present invention is applied to a polymer lithium-ion secondary cell in actual practice.

That is, FIG. 8 shows the case in which the lead according to the present invention is applied to a polymer lithium-ion secondary cell of gel electrolyte made of polyacrylonitrile (PAN).

As shown in FIG. 8, a lead 3 is shaped as a thin slit and its thickness is about 0.1 mm, for example. This lead 3 is sandwiched by heat fusion-bonding portions 2 of a container 5 so as to expose one portion thereof to the outside of the container 5 when the container 5 of the polymer lithium-ion secondary cell is sealed by heat fusion-bonding.

Also, there are provided two leads 3 for one cell. One of the two leads 3 is a positive electrode made of an aluminum thin plate, for example, and the other is a negative electrode made of a copper thin plate, for example.

Further, as FIG. 8 shows, the lead 3 is coated with a heat fusion-bonding seal material 1 of a constant length at its somewhere in the longitudinal direction thereof.

This lead 3 is covered with the heat fusion-bonding seal material 1 around the lead 3 in the direction perpendicular to the longitudinal direction of the lead 3, i.e. the upper and lower surfaces of the lead 3, further, two side surfaces existing between the upper and lower surfaces are covered by the heat fusion-bonding seal material with a constant thickness or in such a manner that the heat fusion-bonding seal material on the upper and lower surfaces is caused to have the same thickness and the thickness of the material on the two side surface existing between the upper and lower surfaces is caused to become thicker than that of the material on the upper and lower surfaces.

A study of examined results reveals that the thickness of the heat fusion-bonding seal material 1 on the upper and lower surfaces of the lead 3 may be selected in a range of from 10 to 200 $\mu$m.

Also, the materials forming the heat fusion-bonding seal material 1 are materials made of ethylene acrylic acid copolymer (EAA), ethylene methacrylic acid copolymer (EMAA), ionomer resin, carboxylation resin or the like. The feature of the material forming this heat fusion-bonding seal material 1 is that its adhesion relative to the metal is large. That is, these materials have a lead metal adhesion property better than those (will be described in detail later on) of a sealant layer 19 of a laminate film upper layer 15 and a sealant layer 19 of a laminate film lower layer 16.

The features of these materials forming the heat fusion-bonding seal material 1, i.e. the ethylene acrylic acid copolymer (EAA), the ethylene methacrylic acid copolymer (EMAA), the ionomer resin or carboxylation resin are that their melting points are lower than those of the resin films forming the laminate film upper layer 15 and the laminate film lower layer 16, i.e. materials of a sheath layer 17 and the sealant layer 19. Specifically, melting points of ethylene acrylic acid copolymer (EAA), ethylene methacrylic acid copolymer (EMAA), ionomer resin or carboxylation resin fall within a range of 90 to 120(C and are lower than melting points (will be described in detail later on) of the materials of the sheath layer 17 and the sealant layer 19.

While ethylene acrylic acid copolymer (EAA), ethylene methacrylic acid copolymer (EMAA), ionomer resin, carboxylation resin or the like were enumerated as the material of the heat fusion-bonding seal material 1 as described above, the material of the heat fusion-bonding seal material 1 is not limited to these materials, and it is needless to say that other materials may be used so long as the material forming this heat fusion-bonding seal material 1 has an excellent adhesion relative to the lead metal rather than the material of the sealant layer 19 of the laminate film upper layer 15 and the material of the sealant layer 19 of the laminate film lower layer 16 and the melting point of the heat fusion-bonding seal material 1 is lower than that of the material of the sheath layer 17 and the sealant layer 19.

A method of forming the heat fusion-bonding seal material 1 on the lead 3 will be described next.

Specifically, ethylene acrylic acid copolymer (EAA), ethylene methacrylic acid copolymer (EMAA), ionomer resin, carboxylation resin or the like having a thickness ranging from 10 to 200 $\mu$m is heat fusion-bonded on the lead 3 by a hot-melt method or an extrusion laminate method.

This hot-melt method may fusion-bond a resin having a low viscosity obtained in the heating. According to the hot-melt method, a pellet of resin is milled initially, and the resin thus milled is fused at 180° C. by heating. Then, this fused resin of a constant thickness and a constant width is extruded from a nozzle under pressure. Then, the fused resin thus extruded is heat fusion-bonded on the lead 3 with a width of about 10 mm, and wound around the lead 3, thereby resulting in a coated film being formed.

On the other hand, the extrusion laminate method may fusion-bond a resin having a high viscosity obtained in the heating. A method of forming a heat fusion-bonding material on the lead 3 is similar to that of the hot-melt method.

Incidentally, the method of forming the heat fusion-bonding seal material 1 on the lead 3 is not limited to the above-mentioned hot-melt method or extrusion laminate method. It is needless to say that there may be adopted other methods such as a method of forming a layer of a heat fusion-bonding seal material on the lead 3 by heating a wrapped film after the ordinary temperature thin film made of a material which should make a heat fusion-bonding seal material, for example.

Laminate films provided on the upper and lower sides of the lead 3 as shown in FIG. 8 will be described next.

Each of a laminate film upper layer 15 and a laminate film lower layer 16 has a sandwich structure comprising three layers of a sheath layer 17, an aluminum layer 18 and a sealant layer 19 formed from the outside to the inside.

Here, as mentioned above, the materials of the sealant layers 19 of the laminate film upper layer 15 and the laminate film lower layer 16 are limited to limited plastic materials because they have an affinity with gel electrolyte and contained solvent. That is, in the polymer lithium-ion secondary cell of gel electrolyte made of polyacrylonitrile (PAN), the above-mentioned material is limited to polyolefin materials containing no base such as polyethylene, polypropyrene and so on.

Accordingly, as the arrangement of the laminate film, it is possible to use the following materials. Here, plastic materials which are available will be abbreviated as follows: That is, polyethylene terephthalate: PET, fused polypropyrene: PP, non-elongated polypropyrene: CPP, polyethylene: PE, low-density polyethylene: LDPE, high-density polyethylene: HDPE, linear low-density polyethylene: LLDPE, nylon: Ny. Also, aluminum which is a metal material used as a barrier film having a moisture permeability resistance will be abbreviated as Al.

The most popular arrangement is sheath layer/metal film/sealant layer=PET/AL/PE. The arrangement is not limited to the above-mentioned combination, and it is possible to use an arrangement of other popular laminate films which will be described below. That is, sheath layer/metal film/sealant layer=PET/AL/CPP, PET/AL/PET/CPP, PET/Ny/AL/CPP, PET/Ny/AL/Ny/CPP, PET/Ny/AL/Ny/PE, Ny/PE/AL/LLDPE, PET/PE/AL/PET/LDPE or PET/Ny/AL/LDPE/CPP.

As materials of the sealant layers of the laminate films, there may be used PE, LDPE, HDPE, LLDPE, PP, CPP or the like as enumerated in the above-mentioned example. A study of examined results reveals that its thickness may be selected in a range of from 20 to 100 $\mu$m.

Also, melting points of the materials available as the sealant layers will generally be summarized as follows. That is, melting points of PE, LDPE, HDPE and LLDPE fall within a range of from 120 to 150° C., and melting points of PP and CPP are about 180° C.

A melting point of a material available as the sheath layer, i.e. melting point of PET is higher than 230° C.

Although aluminum (AL) is enumerated as the metal material available as the barrier film having a moisture permeability resistance as described above, it is needless to say that the metal material is not limited thereto and that there may be used other materials forming a thin film by, for example, sputtering, such as alumina ($Al_2O_s$), silicon oxide ($SiO_2$) and silicon nitride ($SiN_x$) or the like.

A method of manufacturing a polymer lithium-ion secondary cell using the lead 3 on which the heat fusion-bonding seal material 1 is coated and a method of sealing a container of a lithium-ion secondary cell will be described next.

A heat fusion-bonding seal material having an excellent adhesion relative to a lead metal is previously coated on the lead 3 which contacts with the sealant layer 19 of the laminate film serving as the material of the container of the polymer lithium-ion secondary cell, and the polymer lithium-ion secondary cell is manufactured by this product.

As shown in FIG. 8, the heat fusion-bonding portion 2 is displayed as a halftone area having a constant width around the outer periphery of the laminate film lower layer 16 of the container 5 of the polymer lithium-ion cell. Further, the heat fusion-bonding portion 2 is displayed as a halftone area having a width similar to that of the heat fusion-bonding portion of the container 5 at the portion corresponding to the heat fusion-bonding portion of the container 5 of the heat fusion-bonding seal material 1 coated on the lead 3.

Incidentally, a heat fusion-bonding portion having a constant width is formed around the laminate film upper layer 15 similarly to the laminate film lower layer 16 although not shown in FIG. 8.

Figure 1A:
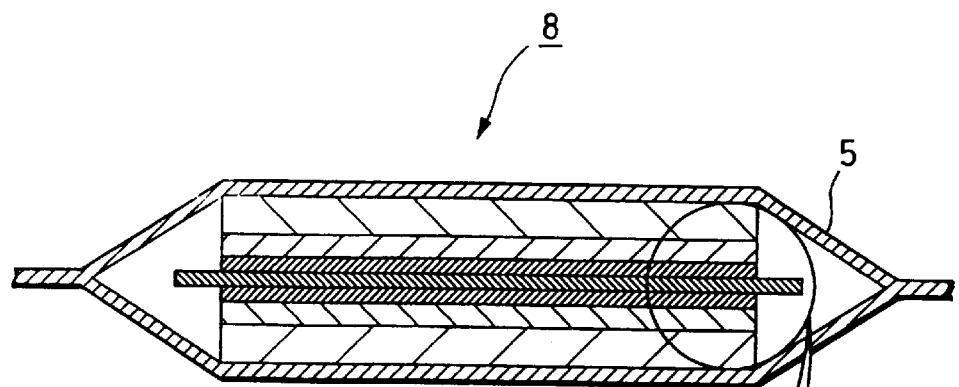
FIG. 1A is a cross-sectional view illustrating a polymer lithium-ion secondary cell.
Figure 1B:
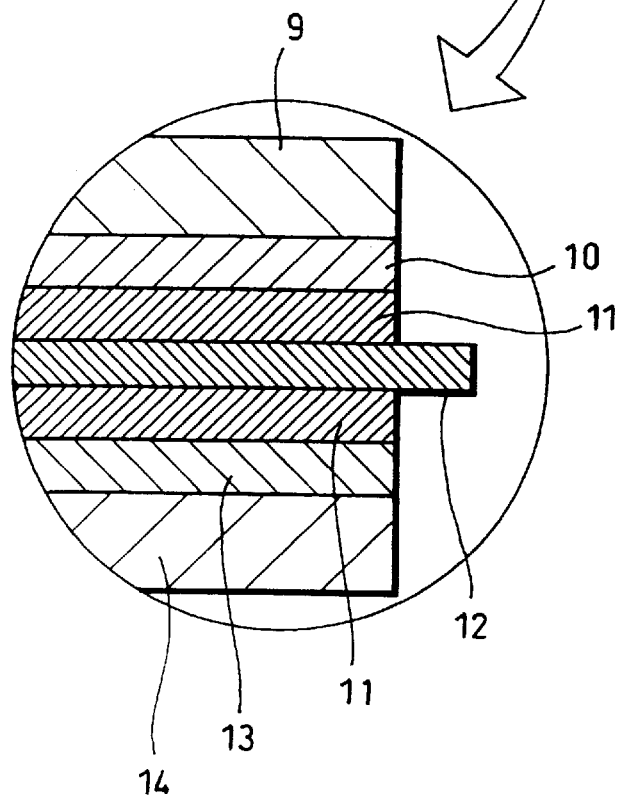
FIG. 1B is a cross-sectional view illustrating a part of the polymer lithium-ion secondary cell in an enlarged scale.
Figure 2A:
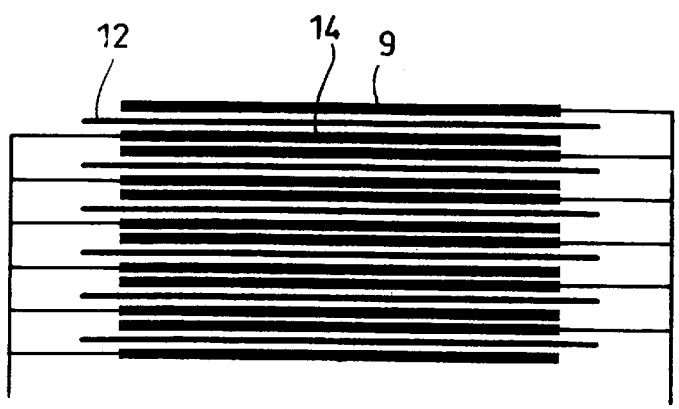
FIGS. 2A to 2C are cross-sectional views illustrating laminated structures of the polymer lithium-ion secondary cell, respectively.
Figure 2B:
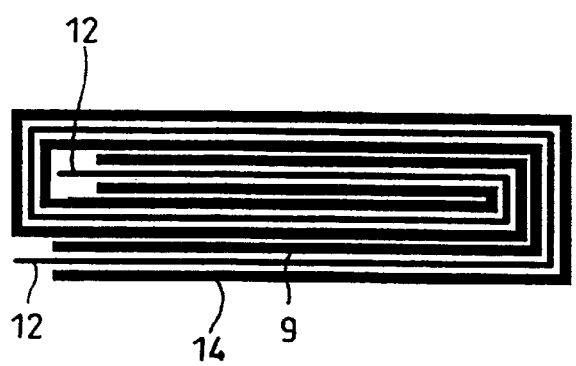
Figure 2C:
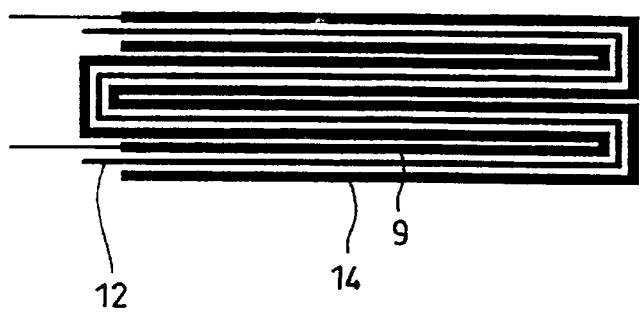
Figure 3A:
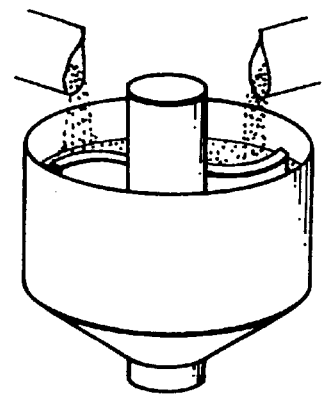
FIGS. 3A to 3D are perspective views illustrating manufacturing processes of a polymer lithium-ion secondary cell, respectively.
Figure 3B:
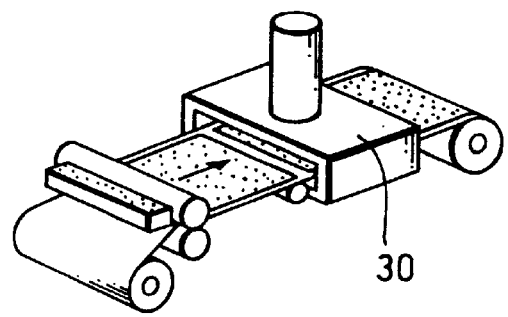
Figure 3C:
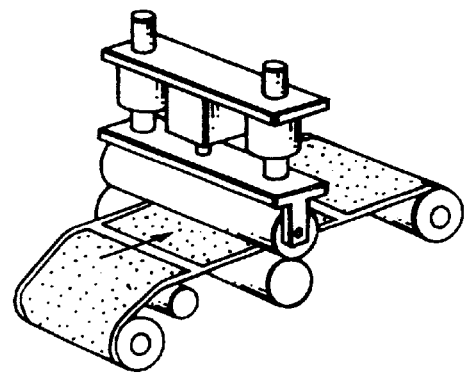
Figure 3D:
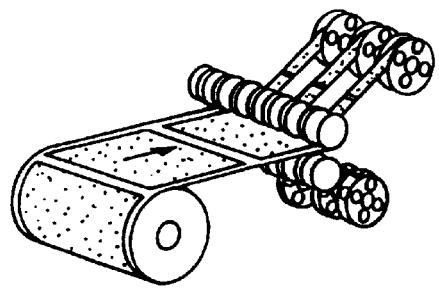
Figure 4A:
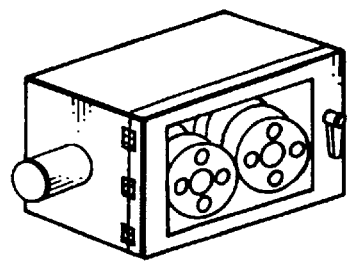
FIGS. 4A to 4D are perspective views illustrating manufacturing processes of a polymer lithium-ion secondary cell, respectively.
Figure 4B:
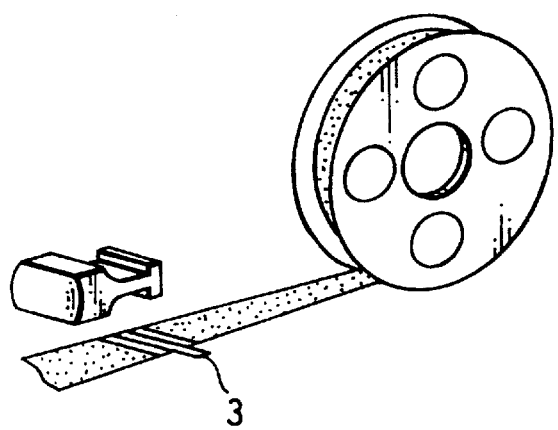
Figure 4C:
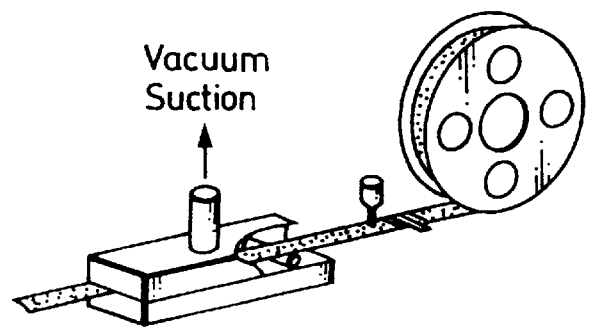
Figure 4D:
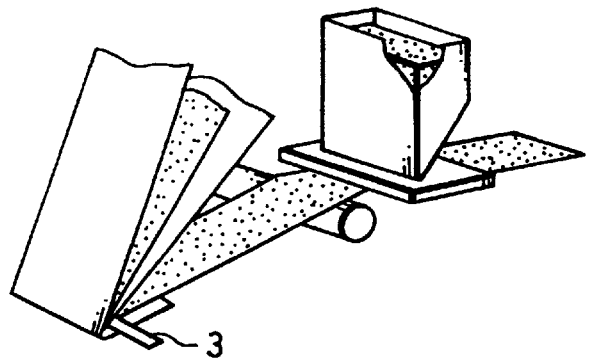
Figure 5A:
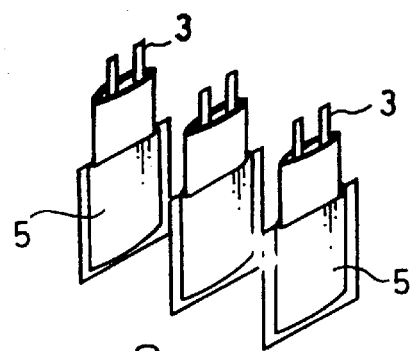
FIGS. 5A to 5E are perspective views illustrating manufacturing processes of a polymer lithium-ion secondary cell, respectively.
Figure 5B:
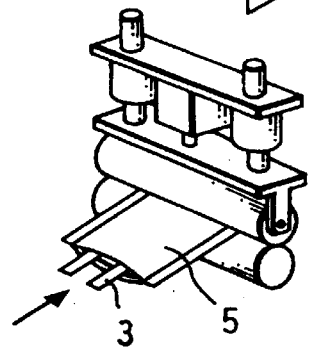
Figure 5C:
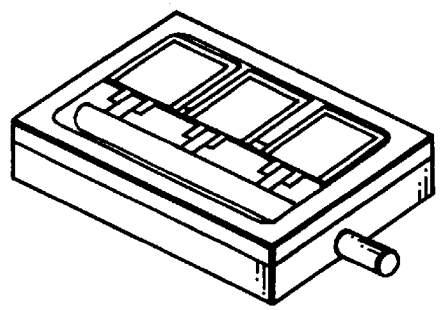
Figure 5D:
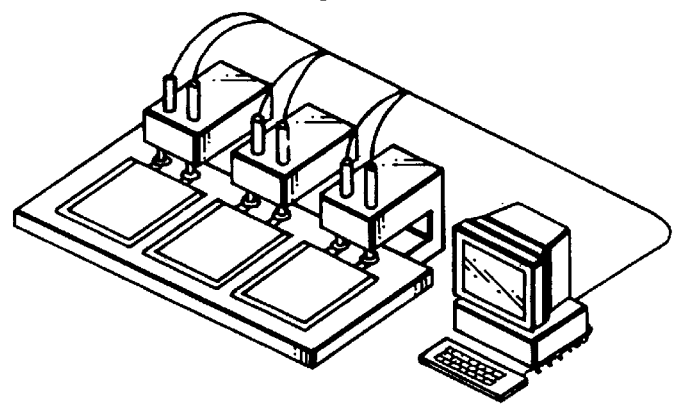
Figure 5E:
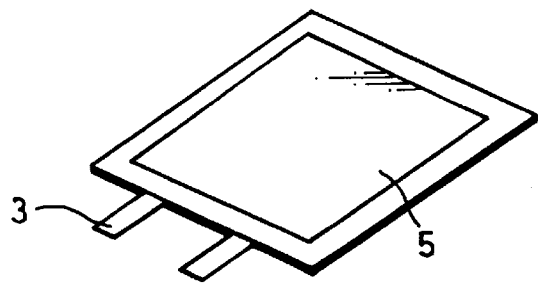
Figures 6A, 6B:
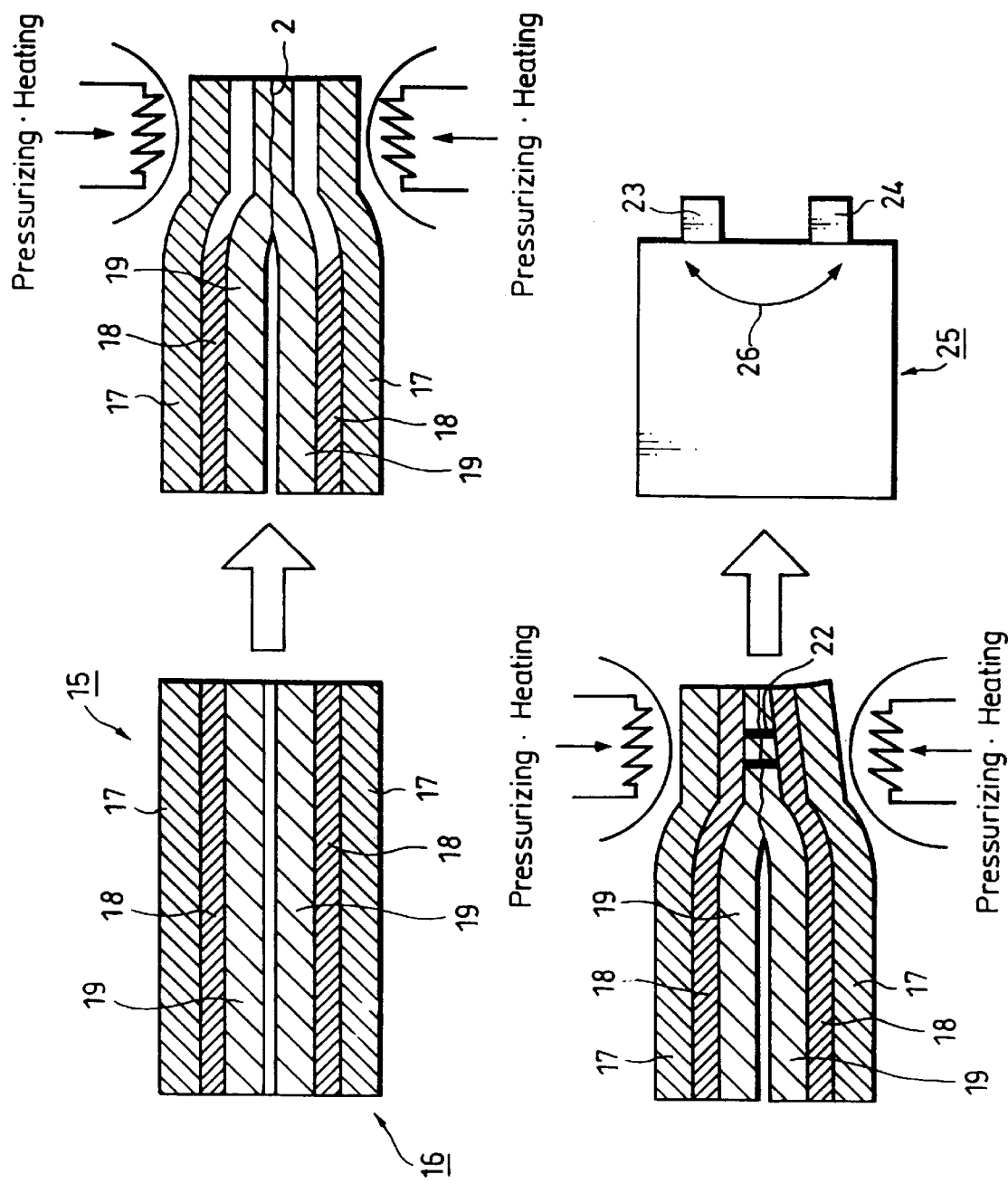
FIGS. 6A and 6B are cross-sectional views illustrating the states of the heat fusion-bonding portions obtained when a container of a polymer lithium-ion secondary cell is heat fusion-bonded properly or not.
Figure 7:
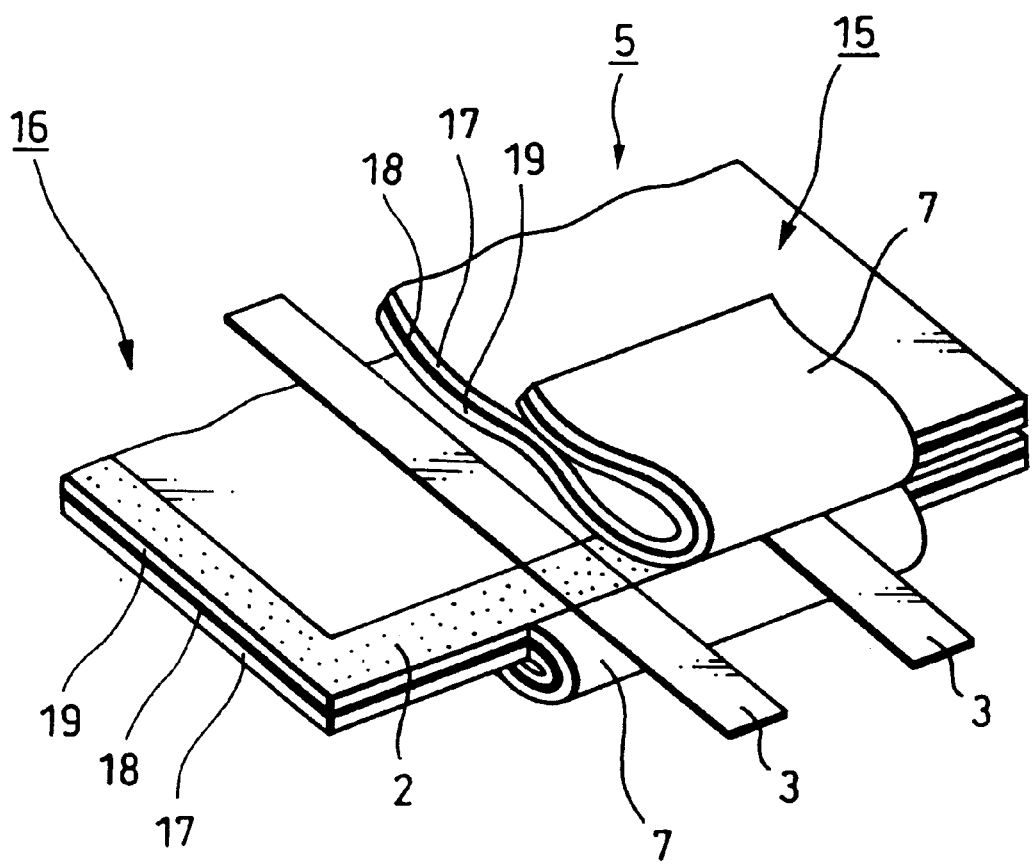
FIG. 7 is a perspective view illustrating a relationship between a lead and a container in a conventional polymer lithium-ion secondary cell.

On the other hand, of the container 5 of the polymer lithium-ion secondary cell, the heat fusion-bonding portions 2 existing on the three sides which do not sandwich the lead 3 are previously heat fusion-bonded as described in FIGS. 6A, 6B with the result that the container 5 is shaped as a bag.

On the other hand, in the remaining one side which is not yet sealed, the heat fusion-bonding seal material 1 formed on the lead 3 is sandwiched between the heat fusion-bonding portions 2 of the laminate film upper layer 15 and the laminate film lower layer 16.

Under this state, in order to seal the remaining one side which is not yet sealed, the laminate film upper layer 15 and the laminate film lower layer 16 are pressed at their ranges corresponding to the heat fusion-bonding portions 2 from the outside of the sheath layers 17 of the laminate film upper layer 15 and the laminate film lower layer 16 at a predetermined temperature and with a predetermined pressure in a predetermined period of time.

Here, the heating temperature is selected to be a temperature such that the sheath layers 17 of the laminate film upper layer 15 and the laminate film lower layer 16 may not be fused and that the sealant layers 19 of the laminate film upper layer 15 and the laminate film lower layer 16 and the heat fusion-bonding seal material 1 of the lead 3 may be fused. However, if the heating temperature increases too much, then the sealant layer 19 flows to cause the aluminum film 18 of the laminate film upper layer 15 and the aluminum film 18 of the laminate film lower layer 16 to contact with each other. Therefore, the heating temperature should be selected to be a temperature which can prevent the sealant layer 19 from flowing.

As described above, the melting point of the material available as the sheath layer 17, i.e. melting point of PET is higher than 230° C. Also, melting points of the materials available as the sealant layers, i.e. melting points of PE, LDPE, HDPE and LLDPE fall within a range of from 120 to 150° C., and melting points of PP and CPP are about 180° C. Also, melting points of the materials forming the heat fusion-bonding seal material, i.e. melting points of ethylene acrylic acid copolymer (EAA), ethylene methacrylic acid copolymer (EMAA), ionomer resin or carboxylation resin fall within a range of from 90 to 120° C., and are lower than the melting point of the material of the sheath layer 17 and the melting point of the material of the sealant layer 19.

Also, the applied pressure should be made large enough to prevent gaps from being produced between the heat fusion-bonding portions 2 of the sealant layers 19 of the laminate film upper layer 15 and the laminate film lower layer 16 after the sealant layers 19 of the laminate film upper layer 15 and the laminate film lower layer 16 and the heat fusion-bonding seal material 1 of the lead 3 were fused by heating and enough to prevent gaps from being produced in a step formed between the laminate film upper layer 15 and the heat fusion-bonding seal material 1 of the lead 3 and to prevent gaps from being produced in a step formed between the laminate film lower layer 16 and the heat fusion-bonding seal material 1 of the lead 3, i.e. the applied pressure should be made large enough to fill the gaps with the fused sealant layer 19 and the fused heat fusion-bonding seal material 1.

However, if the applied pressure increases too much, then the sealant layer 19 flows to cause the aluminum film 18 of the laminate film upper layer 15 and the aluminum film 18 of the laminate film lower layer 16 to contact with each other. Therefore, the applied pressure should be selected to be a pressure which can prevent the sealant layer 19 from flowing.

Further, a heating time and a pressing time are selected in such a range that a heat from a heating apparatus may be sufficiently conducted to the sheath layers 17, the aluminum layers 18 and the sealant layers 16 of the laminate film upper layer 15 and the laminate film lower layer 16 and the heat fusion-bonding seal material 1 of the lead 3.

As described above, it is possible to complete the polymer lithium-ion secondary cell by sealing the heat fusion-bonding portions by heat fusion-bonding after the heat fusion-bonding seal material 1 of the lead 3 was sandwiched between the heat fusion-bonding portions 2 of the container 5. That is, in the present invention, after the lead was sandwiched between the heat fusion-bonding portions of the container, the polymer lithium-ion secondary cell may be manufactured by sealing the heat fusion-bonding portions by heat fusion-bonding.

Opinions of inventors of the present application about a heat fusion-bonding mechanism obtained when the heat fusion-bonding portions are sealed by heat fusion-bonding after the heat fusion-bonding seal material 1 of the lead 3 was sandwiched between the heat fusion-bonding portions 2 of the container 5 will be described below.

When the laminate film upper layer 15 and the laminate film lower layer 16 are heated and pressed at their ranges corresponding to the heat fusion-bonding portions 2 as described above, the sealant layers 19 of the laminate film upper layer 15 and the laminate film lower layer 16 and the heat fusion-bonding seal material 1 of the lead 3 are fused initially.

Then, the fused sealant layer 19 of the laminate film upper layer 15 and the fused sealant layer 19 of the laminate film lower layer 16 are mixed together at their contact portions.

Also, the fused sealant layers 19 of the laminate film upper layer 15 and the laminate film lower layer 16 and the fused heat fusion-bonding seal material 1 of the lead 3 are mixed together at their contact portions.

Also, the fused heat fusion-bonding seal material 1 of the lead 3 is wetted to the metal of the lead 3 in the fused state. On the other hand, as in the case in which the heat fusion-bonding seal material 1 is described above, in the product in which the ordinary temperature thin film made of the material of the heat fusion-bonding seal material 1 is wrapped around the lead 3, the film-like heat fusion-bonding seal material wound around the lead 3 by heating and pressure is fused so that the fused heat fusion-bonding seal material contacts with the metal of the lead 3 in the wetted state.

Then, when this heating is stopped, the laminate film upper layer 15, the laminate film lower layer 16 and the heat fusion-bonding seal material 1 of the lead 3 are cooled, and hence the temperatures of the respective materials become lower than their melting points. As a result, the sealant layer 19 of the laminate film upper layer 15 and the sealant layer 19 of the laminate film lower layer 16 are strongly heat fusion-bonded. Also, the sealant layer 19 of the laminate film upper layer 15 and the heat fusion-bonding seal material 1 of the lead 3 are strongly heat fusion-bonded, and the sealant layer 19 of the laminate film lower layer 16 and the heat fusion-bonding seal material 1 of the lead 3 are heat fusion-bonded strongly. Moreover, the heat fusion-bonding seal material 1 of the lead 3 is cooled at a temperature lower than its melting point, whereby the heat fusion-bonding seal material 1 is bonded to the metal strongly.

As described above, there are formed layers made of the heat fusion-bonding seal material 1 between the lead 3 and the sealant layer 19 of the laminate film upper layer 15 and between the lead 3 and the sealant layer 19 of the laminate film lower layer 16.

The resultant feature is that this heat fusion-bonding seal material 1 has an excellent adhesion relative to the lead 3 rather than the material of the sealant layer 19.

Incidentally, even when the heat fusion-bonding seal material 1 has a slight water-absorbing property, the material used herein does not cause any problem in actual practice. However, in order to sufficiently prevent this water-absorbing property, the widths of the heat fusion-bonding portions of the sealant layers which sandwiched the led are increased or the length of the longitudinal direction of the lead of the heat fusion-bonding seal material of the lead 3 is reduced so that, upon heat fusion-bonding, the heat fusion-bonding seal material 1 of the lead 3 is completely inserted into the heat fusion-bonding portion of the laminate film, thereby resulting in the heat fusion-bonding seal material being hermetically sealed into the heat fusion-bonding portion of the laminate film.

As described above, according to the present invention, the layers made of the heat fusion-bonding seal material 1 are formed between the lead 3 and the sealant layer 19 of the laminate film upper layer 15 and between the lead 3 and the sealant layer 19 of the laminate film lower layer 16. As a result, the portion between the heat fusion-bonding seal material 1 and the sealant layer 19 of the laminate film upper film 15; and the portion between the heat fusion-bonding seal material 1 and the sealant layer 19 of the laminate film lower layer 16 are strongly heat fusion-bonded, especially, the heat fusion-bonding seal material 1 and the lead 3 are heat fusion-bonded very strongly, whereby a moisture permeability resistance, a sealing performance, a barrier property and a safety or the like of the container of the polymer lithium ion secondary cell may be improved and a mechanical peel strength of the heat fusion-bonding portion of the laminate film may be improved remarkably.

Also, according to the present invention, since there is used the lead 3 on which the heat fusion-bonding seal material 1 was previously coated, without being limited by the kinds of the material, the shapes and so on of the lead 3, the sealant layer 19 of the laminate films and the lead 3 may be heat fusion-bonded with ease.

Moreover, since the material having the melting point lower than that of the material of the laminate film is used as the heat fusion-bonding seal material of the lead 3, an adhesion is high, and a reliability of quality is high.

Further, according to the present invention, since the container may be arranged as the minimum package material in necessity, the present invention may be realized as a very small, light-weight and thin polymer lithium-ion secondary cell.

Next, the case in which the end portion of the outer portion side of the heat fusion-bonding seal material 1 is protruded from the end face of the container will be described, and its effects will be referred to.

As shown in FIG. 8, the layer made of the heat fusion-bonding seal material 1 is protruded from the end face of the container at its end portion 1a on the outer portion side of the longitudinal direction of the lead 3. That is, of the end portion of the heat fusion-bonding seal material 1 coated on the lead 3 along the longitudinal direction of the lead 3, i.e. the end portion of the inner portion side of the cell and the end portion of the outside from the cell container, the end portion 1a of the outside from the cell container is outwardly protruded from the end face of the container, i.e. the end face comprised of sides of the side in which the lead 3 is sandwiched in the outside of the container.

The outside end portion 1a of the heat fusion-bonding seal material 1 is disposed outside the end face of the container and the heat fusion-bonding seal material 1 of the lead 3 is heat fusion-bonded so as to be protruded from the width of the heat fusion-bonding portion 2 of the laminate film, thereby resulting in an electrical insulation being maintained. Thus, it is possible to prevent the short-circuit from being caused between the positive electrode and the negative electrode through the aluminum film 18 exposed from the end face of the laminate film. That is, it is possible to prevent the short-circuit from being caused between the leads through the aluminum film exposed from the cut cross-section of the laminate film.

Next, the manner in which the heat fusion-bonding seal material is preheated before the heat fusion-bonding portions are sealed by heat fusion-bonding will be described, and its effect will be referred to.

Prior to the process for sealing the heat fusion-bonding portions by heat fusion-bonding, there is used the process for preheating the heat fusion-bonding seal material, i.e. before the heat fusion-bonding seal material 1 of the lead 3 is sandwiched between the heat fusion-bonding portions of the container 5, the heat fusion-bonding seal material 1 of the lead 3 is preheated.

Here, the temperature of preheating is selected to be near the melting point of the heat fusion-bonding seal material or higher than the melting point. Also, as the preheating method, there may be used ordinary heating means such as a hot-air method for heating the heat fusion-bonding seal material by hot air.

If the heat fusion-bonding seal material of the supplied lead 3 is preheated by a suitable method such as the hot-air method or the like, then a time required when the sealant layer 19 of the laminate film and the heat fusion-bonding seal material of the lead 3 are integrally heat fusion-bonded may be reduced considerably. As a result, it is possible to considerably improve a productivity of polymer lithium-ion secondary cell.

Next, the case in which the lead 3 is formed of the mesh structure will be described, and its effects will be referred to.

As mentioned above, while the lead 3 is of the metal thin-plate shape as shown in FIG. 8, the lead is not limited to the thin-plate shape, and the lead 3 may be formed of the mesh structure. Further, there may be used a variety of mesh structures. For example, there may be used a mesh structure in which recesses in the mesh structure are penetrated from one surface to the other surface of the thin plate or a mesh structure in which recesses are not presented but are penetrated from one surface to the other surface of the thin plate.

The heat fusion-bonding seal material is heat fusion-bonded to the lead having the mesh structure by the hot-melt method or the like, for example, whereby the area in which the lead metal and the heat fusion-bonding seal material are bonded may be increased and the sealing performance of the cell container may be improved much more.

Further, with respect to the lead in which the recesses of the mesh structure are penetrated from one surface to the other surface, since the heat fusion-bonding seal material on one surface is integrally heat fusion-bonded to the heat fusion-bonding seal material of the other surface through these penetrated recesses, it is possible to increase a mechanical strength in which the heat fusion-bonding seal material 1 is peeled from the lead.

Next, the manner in which the heat fusion-bonding seal material of the lead is coated with the same material as that of the sealant layer of the laminate film will be described, and its effect will be referred to.

While the lead 3 is coated with the heat fusion-bonding seal material made of the material having the excellent adhesion relative to the metal as described above, the present invention is not limited to this structure, and may take other structures.

Figure 9A:
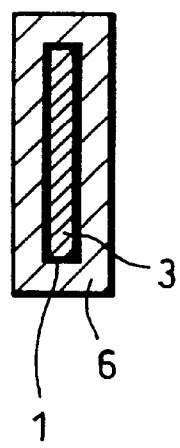
FIG. 9A is a cross-sectional view illustrating a lead on which a heat fusion-bonding seal material and a coated film are formed.
Figure 9B:
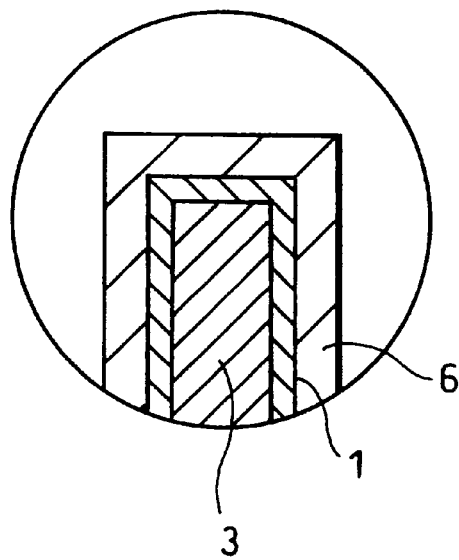
FIG. 9B is a cross-sectional view illustrating a part of the lead shown in FIG. 9A in an enlarged scale.

As shown in FIGS. 9A and 9B, for example, the heat fusion-bonding seal material 1 may be coated with the same material as that of the sealant layer 19 of the laminate film. That is, there may be used a structure such that a layer made of the same material as that of the sealant layer 19 is formed between the heat fusion-bonding seal material 1 and the sealant layer 19 after the lead in which this heat fusion-bonding seal material 1 is coated with the same material as that of the sealant layer 19 was heat fusion-bonded between the sealant layers 19 of the laminate films.

As shown in FIGS. 9A and 9B, the layer which covers the lead 3 presents a two-layer structure.

Here, the layer of the heat fusion-bonding seal material 1 is formed on the surface of the lead 3. That is, a material having an excellent adhesion relative to a metal, such as ethylene acrylic acid copolymer (EAA), ethylene methacrylic acid copolymer (EMAA), ionomer resin, carboxylation resin or the like is formed on the lead 3 so as to have a thickness of 10 to 100 (m based on the examined results.

Further, a coating film 6 is formed on the outside of this heat fusion-bonding seal material 1. That is, this coating film 6 is made of the same material as that of the sealant layer 19 of the laminate film, and has a thickness of 20 to 100 (m based on the examined results.

Such heat fusion-bonding seal material and the coating film may be formed by ordinary means such as an extrusion laminate method a hot-melt method or the like.

The heat fusion-bonding seal material directly attached to the lead is made of ethylene acrylic acid copolymer (EAA), ethylene methacrylic acid copolymer (EMAA), ionomer resin, carboxylation resin or the like as described above, and these materials have a very small amount of water-absorbing property. Although these materials have the amount of water-absorbing property as described above, such water-absorbing property may not affect the product container in actual practice. In order to more reliably hinder the water-absorbing property, however, such a problem of water-absorbing property may be solved by extending the width of the heat fusion-bonding portion 2 of the sealant layer 19 longer than the length of the heat fusion-bonding seal material of the lead along the longitudinal direction of the lead as earlier noted in the above-mentioned example.

Here, since the heat fusion-bonding seal material is coated with the same material as that of the sealant layer 19 of the laminate film, the heat fusion-bonding seal material is covered with a material having an excellent water-resisting property, while maintaining a powerful adhesion of the heat fusion-bonding seal material relative to the lead. Thus, there can be removed the drawback in which the heat fusion-bonding seal material has the water-absorbing property. In addition, since this coating film and the sealant layer of the laminate film of the container are made of the same material, in the heat fusion-bonding process, the coating film and the sealant layer may be heat fusion-bonded more easily and more reliably, thereby making it possible to remarkably improve a mechanical strength against peeling.

Next, with respect to the lead to which the heat fusion-bonding seal material is attached, the manner in which the lead is coated with the heat fusion-bonding seal material at every constant interval of the longitudinal direction when the lead is supplied to a manufacturing line as a ribbon will be described, and its effects will be referred to.

As earlier noted with reference to FIG. 8, the lead with the heat fusion-bonding seal material attached is shaped such that the heat fusion-bonding seal material is attached to somewhere of a slit-like metal thin plate. While the lead should finally be shaped as described above, the shape of the lead obtained in the preceding stage, i.e. when the lead is supplied to the manufacturing line, is not limited to the above-mentioned shape.

Figure 10:
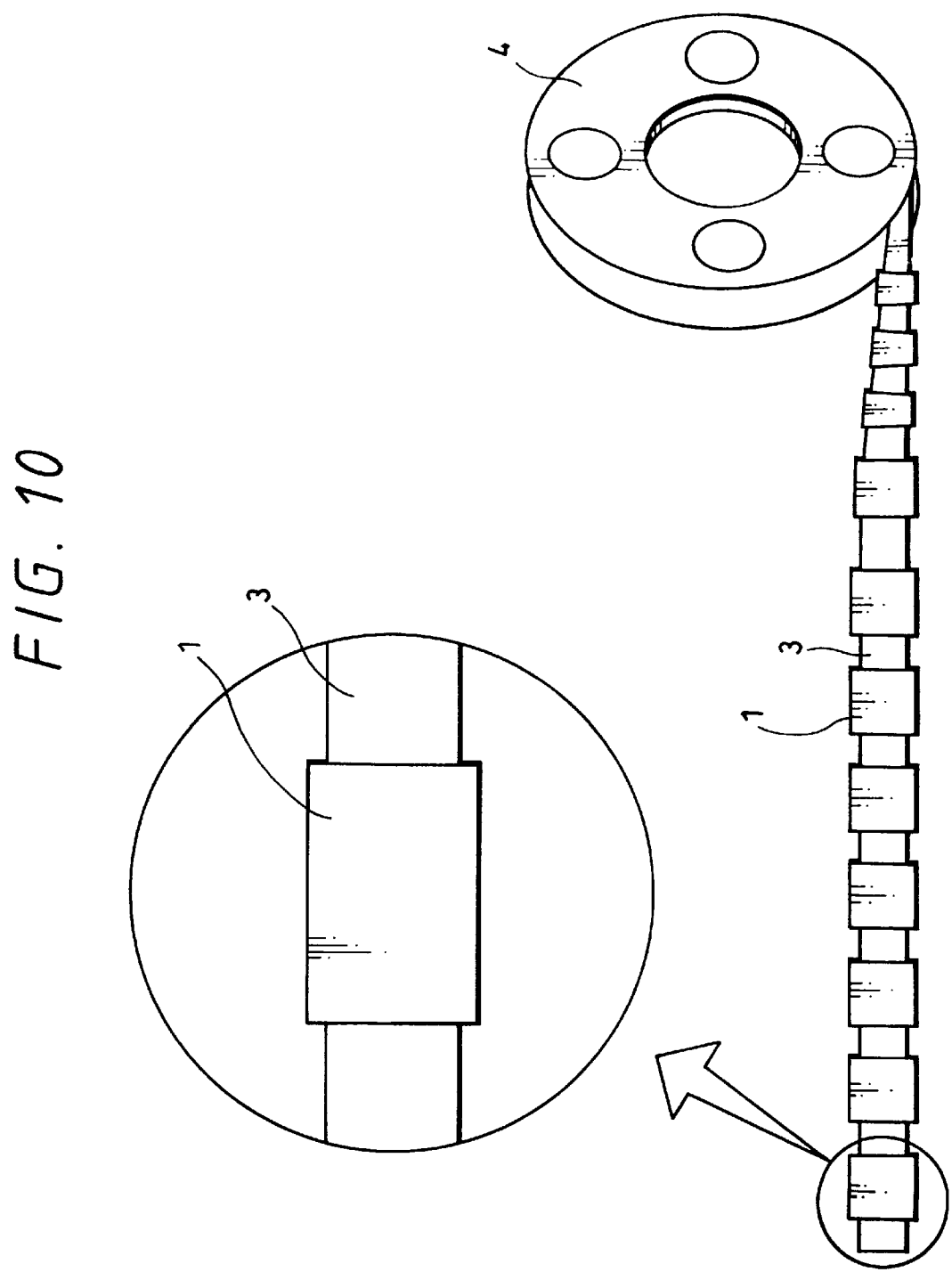
FIG. 10 is a diagram showing the manner in which a ribbon on which a heat fusion-bonding seal material is coated is supplied from a reel.

As shown in FIG. 10, for example, the whole of the lead is shaped like a ribbon and is coated with the heat fusion-bonding seal material at every constant interval in the longitudinal direction thereof. That is, when the lead is shaped as such ribbon-like lead and this ribbon-like lead is supplied to the manufacturing line, there may be manufactured the lead 3 by cutting the heat fusion-bonding seal material at every predetermined interval.

Since the ribbon with the heat fusion-bonding seal material attached is manufactured at an arbitrary interval in a string-fashion and rewound, the lead may be supplied by a reel 4, i.e. may be automatically and smoothly fed to production facilities in consideration of the automation, and may be smoothly applied to production facilities.

While the present invention is applied to the polymer lithium-ion secondary cell of the gel electrolyte made of polyacrylonitrile (PAN), the present invention is not limited thereto, and may of course be applied to a polymer lithium-ion secondary cell of gel electrolyte made of other materials and a solid-electrolyte lithium-ion secondary cell.

Furthermore, the present invention is not limited to the above-mentioned embodiment, and may take various modifications without departing from the gist of the present invention.

The heat fusion-bonding seal material according to other embodiment of the present invention will be described below.

Initially, the lead coated with the heat fusion-bonding seal material will be described, and its effects will be referred to.

FIG. 8 is a perspective view illustrating conceptually an example in which a lead according to the present invention is applied to a polymer lithium-ion secondary cell in actual practice similarly to the above-mentioned embodiment.

That is, FIG. 8 shows the case in which the lead according to the present invention is applied to a polymer lithium-ion secondary cell of gel electrolyte made of polyacrylonitrile (PAN).

As shown in FIG. 8, the lead 3 is coated with the heat fusion-bonding seal material 1 of the constant length in somewhere in its longitudinal direction.

A study of examined results reveals that the thickness of the heat fusion-bonding seal material 1 on the upper and lower surfaces of the lead 3 may be selected in a range of from 50 to 200 $\mu$m.

Also, the material forming the heat fusion-bonding seal material 1 is made of denatured polyolefin resin. The feature of the material forming this fusion-bonding seal material 1 is that its adhesion relative to the material is large. Specifically, this material has an excellent adhesion relative to the lead metal as compared with the material (which will be described in detail later on) of the sealant layer 19 of the laminate film upper layer 15 and the sealant layer of the laminate film lower layer 16.

The feature of the material forming this heat fusion-bonding seal material 1, i.e. denatured poloyolefin resin is that its melting point is lower than that of the material of the resin film forming the laminate film upper layer 15 and the laminate film lower layer 16, i.e. the material of the sheath layer 17 and the sealant layer 19. That is, the melting point of the denatured polyolefin resin falls within a range of 80 to 140° C., and is lower than aa melting point (will be described in detail later on) of the material of the sheath layer 17 and the sealant 19.

Incidentally, while the denatured polyolefin resin is enumerated as the material of the heat fusion-bonding seal material 1 as described above, the present invention is not limited to the above-mentioned material. So long as the material forming this heat fusion-bonding seal material has an excellent adhesion relative to the lead material as compared with the material of the sealant layer 19 of the laminate film lower layer 16 and the melting point of the heat fusion-bonding seal material is lower than that of the material of the sheath layer 17 and the sealant layer 19, other materials may of course be used.

Next, a method of forming the heat fusion-bonding seal material 1 on the lead 3 will be described.

Specifically, a denatured polyorefin resin having a thickness ranging of from 50 to 200 μm is fused on the lead 3 by a hot-melt method or an extrusion laminate method.

The method of forming the layer of the heat fusion-bonding seal material 1 on the lead 3 is not limited to the above-mentioned hot-melt method or extrusion laminate method, and it is needless to say that there may used other methods such as a method in which an ordinary temperature thin film made of a material is wound around the lead 3 and then this wrapped film is heated to form the layer of the heat fusion-bonding seal material on the lead or the like.

Next, a method of manufacturing a polymer lithium-ion secondary cell using the lead 3 on which the heat fusion-bonding seal material 1 is coated will be described.

Here, on the lead 3 which contacts with the sealant layer 19 of the laminate film which is available as the material of the container of the polymer lithium-ion secondary cell, a heat fusion-bonding seal material having an excellent adhesion relative to the lead material is coated in advance, and the polymer lithium-ion secondary cell is manufactured by using this product.

As is clear form FIG. 8, the heat fusion-bonding portion 2 is displayed as a halftone area having a constant width around the outer periphery of the laminate film lower layer 16 of the container 5 of the polymer lithium-ion cell. Further, the heat fusion-bonding portion 2 is displayed as a halftone area having a width similar to that of the heat fusion-bonding portion of the container 5 in the fusion-bonding seal material 1 coated on the lead 3 at its portion corresponding to the heat fusion-bonding portion of the container 5.

Incidentally, although not shown in FIG. 8, although not shown in FIG. 8, a heat fusion-bonding portion having a constant width is formed around the outer periphery of the laminate film upper layer 15 similarly to the laminate film lower layer 16.

Of the container 5 of the polymer lithium-ion secondary cell, the heat fusion-bonding portions 2 existing on the three sides which do not sandwich the lead 3 are previously heat fusion-bonded with the result that the container 5 is shaped as a bag.

On the other hand, in the remaining one side which is not yet sealed, the heat fusion-bonding seal material 1 formed on the lead 3 is sandwiched between the heat fusion-bonding portions 2 of the laminate film upper layer 15 and the laminate film lower layer 16.

Under this state, in order to seal the remaining one side which is not yet sealed, the laminate film upper layer 15 and the laminate film lower layer 16 are pressed at their ranges corresponding to the heat fusion-bonding portions 2 from the outside of the sheath layers 17 of the laminate film upper layer 15 and the laminate film lower layer 16 at a predetermined tempreture and with a predetermined pressure in a predetermined period of time.

Here, the heating tempreture is selected to be a tempreture such that the sheath layers 17 of the laminate film upper layer 15 and the laminate film lower layer 16 may not be fused and that the sealant layers 19 of the laminate film upper layer 15 and the laminate lower 116 and the heat fusion-bonding seal material 1 of the lead 3 may be fused. However, if the heating tempreture increases too much, then the sealant layer 19 flows to cause the aluminum film 18 of the laminate film upper layer 15 and the aluminum film 18 of the laminate film lower layer 16 to contact with each other. Therefore, the heating tempreture should be selected to be a tempreture which can prevent the sealant layer 19 from flowing.

As described above, the melting point of the material available as the sheath layer 17, i.e. melting point of the PET is higher than 230° C. Also, melting points of the materials available as the sealant layers, i.e. melting points of RE, LDPE, HDPE and LLDPE fall within a range of from 120 to 150° C., and the melting points of PP and CPP are about 180° C. Also, the melting point of the material forming the heat fusion-bonding seal material, i.e. melting point of denatured polyolefin resin falls within a range of from 80 to 140° C., and is lower than the melting point of the material of the sheath layer 17 and the melting point of the material of the sealant layer 19.

Also, the applied pressure should be made large enough to prevent gaps from being produced between the heat fusion-bonging portions 2 of the sealant layers 19 of the laminate film upper layer 15 and the laminate film lower layer 16 after the sealant layers 19 of the laminate film 19 of the laminate film upper layer 15 and the laminate film lower layer 16 and the heat fusion-bonding seal material 1 of the lead 3 were fused by heating and between the heat fusion-bonding material 1 of the lead 3 and the sealant layer 19, and enough to prevent gaps from being produced in a stepped portion formed between the laminate film lower layer 16 and the heat fusion-bonding seal material 1 of the lead 3, i.e. the applied pressure should be made large enough to fill the gaps with the fused sealant layer 19 and the fused heat fusion-bonding seal material 1.

However, if the applied pressure increases too much, then the sealant layer 19 flows to cause the aluminum film 18 of the laminate film lower layer 16 to contact with each other. Therefore, the applied pressure should be selected to be a pressure which can prevent the sealant layer 19 from flowing.

Further, a heating time and a pressing time are selected in such a range that a heat from a heating apparatus may be sufficiently conducted to the sheath layers 17, the aluminum layers 18 and the sealant layers 19 of the laminate film upper layer 15 and the laminate film lower layer 16 and the heat fusion-bonding seal material 1 of the lead 3.

As described above, it is possible to complete the polymer lithium-ion secondary cell by sealing the heat fusion-bonding portions by heat fusion-bonding after the lead was sandwiched between the heat fusion-bonding portions 2 of the container 5. That is, in the present invention, after the lead was sandwiched between the heat fusion-bonding portions of the container, the polymer lithium-ion secondary cell may be manufactured by sealing the heat fusion-bonding portions according to heat fusion-bonding.

Incidentally, even when the heat fusion-bonding seal material 1 has a slight water-absorbing property, the material used herein does not cause any problem in actual practice. However, in order to sufficiently present this water-absorbing property, the widths of the heat fusion-bonding portions of the sealant layers which sandwiched the lead are increased or the length of the longitudinal direction of the lead of the heat fusion-bonding seal material of the lead 3 is reduced so that, upon heat fusion-bonding, the heat fusion-bonding seal material 1 of the lead 3 is completely inserted into the heat fusion-bonding of the laminate film, thereby resulting in the heat fusion-bonding seal material being hermetically sealed into the heat fusion-bonding portion of the laminate film.

As described above, according to the present invention, the layers made of the heat fusion-bonding seal material 1 are formed between the lead 3 and the sealant layer 19 of the laminate film upper layer 15 and between the lead 3 and the sealant layer 19 of the laminate film lower layer 16. As a result, the portions between the heat fusion-bonding seal material 1 and the sealant layer 19 of the laminate film, upper film 15; and between heat fusion-bonding seal material 1 and the sealant layer 19 of the laminate film lower layer 116 are strongly heat fusion-bonded, especially, the heat fusion-bonding seal material 1 and the lead 3 are heat fusion-bonded, especially, the heat fusion-bonding seal material 1 and the lead 3 are heat fusion-bonded very strongly, whereby a moisture permeability resistance, a sealing performance, a barrier property and a safety of the like of the container of the polymer lithium-ion secondary cell may be improved and a mechanical peel strength of the heat fusion-bonding portion of the laminate film may be improved remarkably.

Also, according to the present invention, since there is used the lead 3 on which the heat fusion-bonding seal material 1 was previously coated, without being limited by the kinds of the material, the shapes or the like of the lead 3, the sealant layer 19 of the laminate film and the lead 3 may be heat fusion-bonding with ease.

Moreover, since the material being having the melting point lower than that of the material of the laminate film is used as the heat fusion-bonding seal material of the lead 3, an adhesion is large, and a reliably of quality is high.

Further, according to the present invention, since the container may be arranged as the minimum package material in necessity, the present invention may be realized as a very small, light-weight and thin polymer lithium-ion secondary cell.

Next, the case in which the heat fusion-bonding seal material of the lead is coated with the polyethylene resin will be described, and its effects will be referred to.

While the lead is coated with the heat fusion-bonding seal material made of the material having the excellent adhesion relative to the metal as described above, the present invention is not limited to this structure, and may take other structures. As show in FIGS. 9A and 9B, for example, the heat fusion-bonding seal material 1 of the lead 3 may be coated with the polyethylene resin and the material of the heat fusion-bonding portion is polyethylene resin. That is, there may be used a structure such that, after the lead in which the heat fusion-bonding seal material 1 is coated with the polyethylene resin was heat fusion-bonded between the sealant layers 19 made of the polyethylene resin of the laminate films, the layer made of the polyethylene resin if formed between the heat fusion-bonding seal material 1 and the sealant layer 19.

As shown in FIGS. 9A and 9B, the layer which covers the lead 3 presents a two-layer structure.

Here, the layer of the heat fusion-bonding seal material 1 is formed on the surface of the lead 3. That is, a material having an excellent adhesion relative to a material, such as ethylene acrylic acid copolymer (EAA), ethylene methacrlic acid compolymer (EMAA), ionomer resin, carboxylation resin, denatured polyolefin resin or the like is formed on the lead 3 so as to have a thickness of 10 to 100 $\mu$m based on the examined results.

Further, the coating film 6 is formed on the outside of this heat fusion-bonding seal material 1. That is, this coating film 6 is made of the polyethylene resin, and has a thickness of 20 to 100 $\mu$m based in the examined results.

Incidentally, the polyethylene resin contains low-density polyethylene (LDPE), or the like. Also, as the material for coating the heat fusion-bonding seal material and the material of the heat fusion-bonding portion, there may be used any of these resins belonging to the polyethylene resin. That is, in the combination of the material for coating the heat fusion-bonding portion, the kind os resins are not limited as long as the resins belong to the polyethylene resin.

Such heat fusion-bonding seal material and the coating film may be formed by ordinary means such as an extrusion laminate method, a hot-melt method and so on.

The heat fusion-bonding seal material directly attached to the lead is made of ethylene acrylic acid copolymer (EAA), ethylene methacrylic acid copolymer (EMAA), ionomer resin, carboxylation resin, or denatured polyolefin resin or the like as described above, and these materials have a very small water-absorbing property. Although these materials have the water-absorbing property as described above, such water-absorbing property may not affect the product container in actual practice. In order to more reliably hinder the water-absorbing property, such a problem of water-absorbing property may be solved by extending the width of the heat fusion-bonding portion 2 of the sealant layer 19 longer than the length of the heat fusion-bonding seal material of the lead along the longitudinal direction of the lead as earlier noted in the above-mentioned example.

Here, since the heat fusion-bonding seal material of the lead is coated with the polyethylene resin and the material of the heat fusion-bonding portion is the polyethylene resin, the heat fusion-bonding seal material is covered with a material having an excellent water-resisting property, while maintaining a powerful adhesion of the heat fusion-bonding seal material relative to the lead. Thus, there can be removed the drawback in which the heat fusion-bonding seal material has the water-absorbing property. In addition, since this coating are made of the polyethylene resin, in the heat fusion-bonding process, the coating film and the sealant layer may be heat fusion-bonded more easily and more reliably, thereby making it possible to remarkably improve a mechanical strength against peeling.

While the heat fusion-bonding seal material of the lead is coated with the polyethylene resin and the material of the heat fusion-bonding portion is the polyethylene resin as described above, the present invention is not limited thereto, and may be applied to other case in which the heat fusion-bonding seal material of the heat fusion-bonding portion is a polypropylene resin, with similar effects being achieved.

Incidentally, the polypropylene resin contains non-elongated polupropylene (CPP), elongated polupropylene (OPP) and the like. As the material for coating the heat fusion-bonding seal material and the material of the heat fusion-bonding portion, there may be used any of there resins which belong to the polupropylene resin. That is, in the in the combination of the material for coating the heat fusion-bonding seal material and the material of the heat fusion-bonding material, the kinds of resins are not limited so long as the resins belong to the polypropylene resin.

Next, the case in which the coating material is shaped in the cross-section perpendicular to the longitudinal direction of the lead in such a manner that its thickness is reduced in the outside at both sides of its width direction will be described and its effects will be referred to.

Figure 11A:
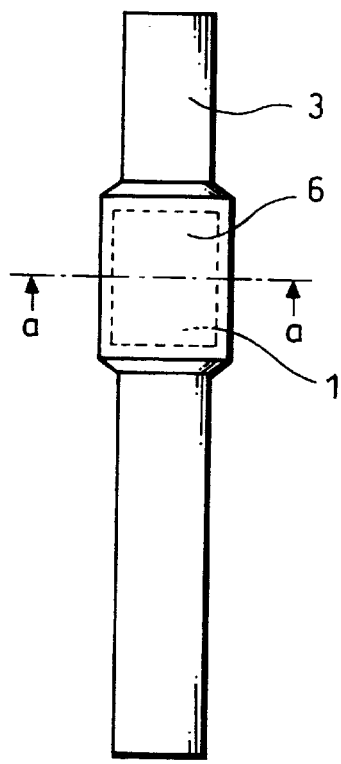
FIG. 11A is a plan view of a lead according to the present invention.
Figure 11B:
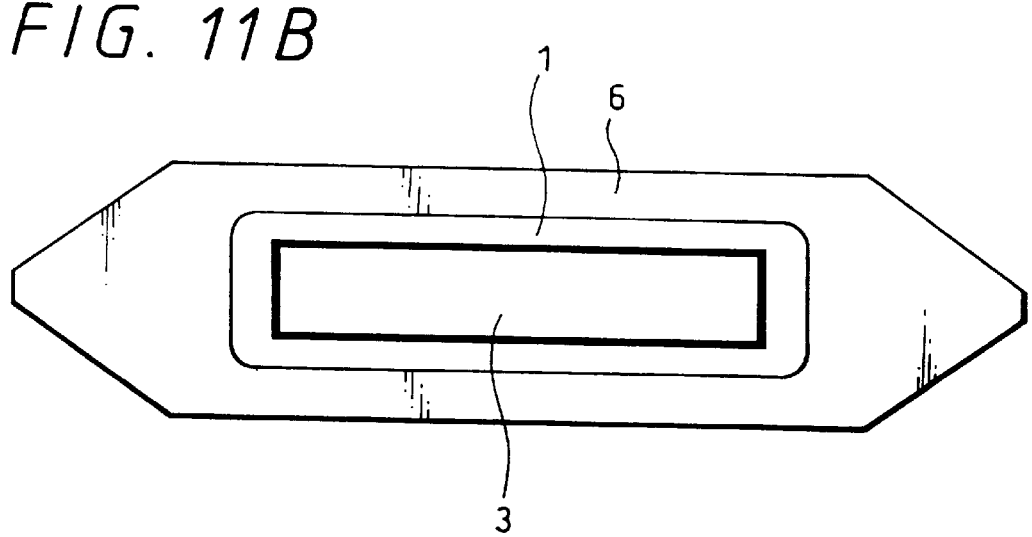
FIG. 11B is a cross-sectional view taken along the line a—a in FIG. 11A.

FIG. 11A is a plan view of a lead according to the present invention, and FIG. 11B is a cross-sectional view taken along the line a—a in FIG. 11A.

As FIGS. 11A and 11B show, the heat fusion-bonding seal material 1 covers the lead 3 at its portion slightly displaced from the central portion of the longitudinal direction of the lead 3. Also, around this heat fusion-bonding seal material 1, there is coated the coating film 6 so as to surround the whole outer surface of the heat fusion-bonding seal material 1.

Also, as will be understood from FIG. 11B, in the shape of the coating film 6 in the cross-section perpendicular to the longitudinal direction of the lead, its thickness is reduced in the outside at both sides of the its width direction (left and right directions in FIG. 11B). Specifically, the thickness of the coating film 6 presents a constant thickness from the width of the heat fusion-bonding seal material 1 to the slight outer side in its width direction. Further, on the upper and lower surfaces of the coating film 6, there are inwardly formed slopes each having a constant angle. The two slopes are extended just before they cross each other. The two slopes are chamfered in the thickness direction (upper and lower directions in FIG. 11B) immediately before they cross each other.

The outer shape of the coating film 6 is not limited to the above-mentioned one, and other shapes may be used. Specifically, the outer shape of the coating film 6 may be modified as follows: the coating film 6 has the shape similar to that of FIG. 11B while the angles of the slopes are changed; unlike FIG. 11B in which the slopes are formed on both of the upper surface and the lower surface, the slope is formed on any one of the upper and lower surfaces; and unlike FIG. 11B in which its thickness has a constant area, the whole thickness has left and right slopes relative to the width direction; and so on. Moreover, the outer shape of the cross-section may not always be provided by combinations of straight lines but may be provided by only curves such as elliptical shapes or a combination of a curve and a straight line, etc. In short, the coating film 6 in the cross-section perpendicular to the longitudinal direction of the lead may be shaped such that its thickness is reduced in the outside at both sides of at least its width direction.

Further, while the cross-sectional shape of the coating film which covers the heat fusion-bonding seal material has been described so far, the present invention may of course be applied to a cross-sectional shape of a heat fusion-bonding seal material obtained in a lead having no coating film covered thereon, i.e. when the lead is coated with only the heat fusion-bonding seal material.

As described above, since the heat fusion-bonding seal material for coating the lead or the coating film has the above-mentioned cross-sectional shape, there may be achieved the following effects.

That is, in one remaining side which is not yet sealed in the container 5 of the polymer lithium-ion secondary cell, the heat fusion-bonding seal material or the coating film formed on the lead 3 is sandwiched between the heat fusion-bonding portions 2 of the laminate film upper layer 15 and the laminate film lower layer 16.

Under this state, in order to seal the remaining one side which is not yet sealed, the laminate film upper layer 15 and the laminate film lower layer 16 are pressed at their ranges corresponding to the heat fusion-bonding portions 2 from the outside of the sheath layers 17 of the laminate film upper layer 15 and the laminate film lower layer 16 at a predetermined temperature and with a predetermined pressure in a predetermined period of time.

Here, the heating temperature should be made large enough to prevent gaps from being produced between the heat fusion-bonding portions 2 of the sealant layers 19 of the laminate film upper layer 15 and the laminate film lower layer 16 and between the heat fusion-bonding seal material of the lead 3 or the coating film and the sealant layer 19 after the sealant layers 19 of the laminate film upper layer 15 and the laminate film lower layer 16 and the heat fusion-bonding seal material 1 of the lead 3 or the coating film were fused by heating and enough to prevent gaps from being produced in a stepped portion formed between the laminate film upper layer 15 and the heat fusion-bonding seal material 1 of the lead 3 and to prevent gaps from being produced in a stepped portion formed between the laminate film lower layer 16 and the heat fusion-bonding seal material 1 of the lead 3, or the coating film i.e. the heating temperature should be made high enough to fill the gaps with the fused sealant layer 19 and the fused heat fusion-bonding seal material or the coating film.

However, when the cross-sectional shape of the heat fusion-bonding seal material or the coating film is rectangular, for example, the stepped portion produced between the laminate film upper layer 15 and the heat fusion-bonding seal material of the lead 3 or the coating film and the stepped portion produced between the laminate film lower layer 16 and the heat fusion-bonding seal material of the lead 3 or the coating film are large so that there is then the problem that the gap cannot be filled sufficiently with the fused sealant layer 19 and the fused heat fusion-bonding seal material or the coating film.

Since the heat fusion-bonding seal material or the coating film has such a shape in the cross-section perpendicular to the longitudinal direction of the lead that its thickness is reduced in the outside at its both sides of at least its width direction, a gap may be prevented from being produced between the fused sealant layer 19 and the fused heat fusion-bonding seal material or the fused coating film. As a result, a sealing performance between the heat fusion-bonding seal material of the lead 3 or the coating film and the sealant layer 19, i.e. sealing performance of the container may be improved.

While the present invention is applied to the polymer lithium-ion secondary cell of the gel electrolyte made of polyacrylonitrile (PAN), the present invention is not limited thereto, and may of course be applied to a polymer lithium-ion secondary cell of gel electrolyte made of other materials and a solid-electrolyte lithium-ion secondary cell.

Furthermore, the present invention is not limited to the above-mentioned embodiment, and may take various modifications without departing from the gist of the present invention.

The present invention may achieve the following effects:

Since the lead is coated with the heat fusion-bonding seal material, this heat fusion-bonding seal material has an excellent adhesion relative to the lead rather than the heat fusion-bonding portion of the container, the heat fusion-bonding portions are sealed by heat fusion-bonding after the heat fusion-bonding seal material of this lead is sandwiched between the heat fusion-bonding portions of the container, a moisture permeability resistance, a sealing performance, a barrier property, a safety or the like of a container may be improved and a mechanical peel strength of heat fusion-bonding portions of a container may be improved remarkably.

Also, since the layer made of the heat fusion-bonding seal material is exposed from the end face of the container at its end portion of the outer portion side along the longitudinal direction of the lead, a short-circuit between a positive electrode and a negative electrode through an aluminum film exposed from an end face of a laminate film may be prevented.

Also, since the heat fusion-bonding seal material is preheated before the heat fusion-bonding portions are sealed by heat fusion-bonding, a time required to integrally bond a sealant layer of a laminate film and a lead by heat fusion-bonding may be reduced considerably.

Further, since the lead has the mesh structure, it is possible to improve the sealing performance of the cell container more.

Further, since the lead ribbon is coated by the heat fusion-bonding seal material at every constant interval of the longitudinal direction, leads may be smoothly and automatically supplied to production facilities in consideration of the automation feed of leads.

Furthermore, since the coating material has such a shape in the cross-section perpendicular to the longitudinal direction of the lead that its thickness is reduced in the outside at both sides of its width direction, the sealing performance of the container may be improved.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A lithium-ion secondary cell having leads sandwiched by heat fusion-bonding portions of a container so as to be exposed to the outside of said container, being characterized in that said leads are coated with a heat fusion-bonding seal material and that said heat fusion-bonding seal material has a lower melting point than that of said heat fusion-bonding portions.

2. A lithium-ion secondary cell as claimed in claim 1, characterized in that said lead has a mesh structure.

3. A lithium-ion secondary cell as claimed in claim 1, characterized in that said heat fusion-bonding seal material is one or more materials selected from the group consisting of ethylene acrylic acid copolymer (EAA), ethylene methacrylic acid copolymer (EMAA), ionomer and carboxylation resin.

4. A lithium-ion secondary cell as claimed in claim 1, characterized in that a layer made of the same material as that of said heat fusion-bonding portions is formed between said heat fusion-bonding seal material and said heat fusion-bonding portions.

5. A method of sealing a lithium-ion secondary cell container, comprising the steps of:

coating leads with a heat fusion-bonding seal material;

sandwiching said leads between heat fusion-bonding portions of said container; and sealing said heat fusion-bonding portions by heat fusion-bonding.

6. A method of sealing a lithium-ion secondary cell container as claimed in claim 5, characterized by further comprising a process for preheating said heat fusion-bonding seal material prior to said process for sealing said heat fusion-bonding portions by heat fusion-bonding.

7. A method for sealing a lithium-ion secondary cell container by heat fusion-bonding as claimed in claim 5, characterized in that said heat fusion-bonding seal material is one or more selected from the group consisting of ethylene acrylic acid copolymer (EAA), ethylene methacrylic acid copolymer (EMAA), ionomer and carboxylation resin.

* * * * *